United States Patent [19]

Yrjönen et al.

[11] Patent Number: 5,225,680
[45] Date of Patent: Jul. 6, 1993

[54] METHOD FOR CORRECTING MEASURING VALUES WHEN MEASURING LIQUID SCINTILLATION SAMPLES DEPOSITED ON SAMPLE PLATES

[75] Inventors: Tapio Yrjönen; Timo Oikari, both of Turku; Kauko Lehtinen, Raisio, all of Finland

[73] Assignee: Wallac Oy, Turku, Finland

[21] Appl. No.: 756,684

[22] Filed: Sep. 9, 1991

[51] Int. Cl.⁵ .................. G01T 1/208; G01T 1/204
[52] U.S. Cl. ................................ 250/362; 250/364; 250/328
[58] Field of Search ............... 250/362, 328, 364

[56] References Cited

U.S. PATENT DOCUMENTS

| | | | |
|---|---|---|---|
| 4,700,072 | 10/1987 | Oikari et al. | 250/328 |
| 4,728,792 | 3/1988 | Warner et al. | 250/328 |
| 4,987,306 | 1/1991 | Dodson | 250/328 |
| 5,043,581 | 8/1991 | Joss | 250/328 |

Primary Examiner—Paul M. Dzierzynski
Assistant Examiner—Richard Hanig
Attorney, Agent, or Firm—Shea & Gould

[57] ABSTRACT

A method for correcting measuring values when measuring liquid scintillation samples deposited on sample plates by a photodetector which will be affected by scintillation photons from other samples in the plate in addition to the sample being measured. Said correction is done by pre-determining affection of the other samples of the plate as a function of quench level and correcting observed measuring values using this function.

4 Claims, 2 Drawing Sheets

METHOD FOR CORRECTING MEASURING VALUES WHEN MEASURING LIQUID SCINTILLATION SAMPLES DEPOSITED ON SAMPLE PLATES

BACKGROUND OF THE INVENTION

Liquid scintillation counters are commonly used to measure the count rate or activity of samples containing low energy beta particles or corresponding particles emitting radionuclides such as tritium and carbon-14.

The range of the low energy beta particles in the sample is generally few tens of micrometers at the most. As a consequence, the sample to be measured has to be placed in direct contact with a scintillation medium, which comprises a solvent or solvents and a solute or solutes present in a few percent by weight of the solution. In this interaction process most of the kinetic energy of the interacted beta particle is absorbed by the solvent and then transferred to the solute which emits scintillation photons, whose amount is proportional to the energy of the interacted beta particle. These scintillation photons are detected usually by two, in coincidence operating, photomultiplier tubes producing electric pulses. The height of the pulses are proportional to the amount of emitted scintillation photons and thus proportional to the energy of the interacted beta particle.

When measuring sample activities with liquid scintillation counters, the basic problem is the reduction of the counting efficiency due to the quenching of the sample.

It is known in the liquid scintillation counting that the reduction of the counting efficiency due to the quenching of the sample can be corrected by a means of a quench curve which describes the relationship between the counting efficiency and the amount of the quench of the sample.

Normally liquid scintillation counters are provided with one detector and they are designed to measure samples in 7 ml or 20 ml glass or plastic vials.

1450 MicroBeta, which is manufactured by Wallac Oy, Finland, is a novel example of a multi-detector liquid scintillation counter, which measures samples in sample plates, which belong to a preselected assortment of different multi-well sample plate types, each having a characteristic two dimensional array of sample wells.

One group of the multi-well sample plates belonging to the preselected assortment consists of 96-well sample plates having eight rows of wells, which diameter is 7–8 millimeters arranged in twelve columns with 9 millimeters distance between the center points of the wells. The typical volumes of the sample wells of such 96-well sample plates are 200–400 microliters depending on the height of the plate.

When the wells of the sample plate are separate, it is placed before counting on a rigid sample plate holder made of photon attenuating material and having thru-holes for the wells of the sample plate. The walls of the holes are reflecting or scattering in order to guide the photons from the liquid scintillation sample to the detectors, built of two photomultiplier tubes situated on the opposite sides of the holes of the sample plate holder. As a consequence, an optically isolated compartment is formed around each sample well of the sample plate.

If the wells of the sample plates are not separate for example sample wells are joined together with ribs in order to stiffen said sample plate, then it is impossible to isolate the wells optically. As a consequence of this some amount of the scintillation photons produced by the absorption of the beta particle in a certain sample well may travel to the nearest sample wells and thus produce an increase in observed count rates in those wells. This affection is called here as crosstalk. This phenomenon is a problem particularly when higher energy isotopes are measured: the higher the kinetic energy of the beta particles, the higher amount photons are produced in the interaction process and the higher amount photons can travel to the other sample wells.

U.S. Pat. No. 4 348 588 (Yrjönen et al.) shows a crosstalk correction method applied in gamma counting. This method is not suitable for liquid scintillation counting, because it does not take into account the variation of the quench of the samples, and it is limited to correct only affection of samples, which are in pre-determined locations.

SUMMARY OF THE INVENTION

The present invention shows a novel method for correcting the errors of the measured count rate values, when measuring liquid scintillation samples having constant or variable quench level deposited in sample plates comprising a plurality of sample wells, which counting error is caused by affection of samples deposited in other sample wells.

DETAILED DESCRIPTION OF THE PREFERRED EMBODIMENTS

Figure 1:
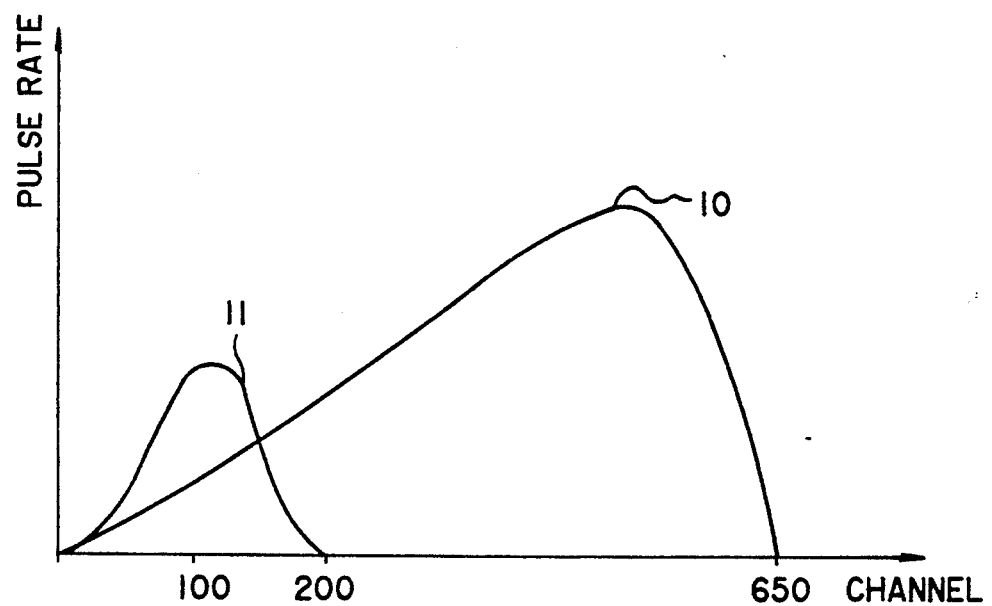
FIG. 1 shows a typical C-14 spectrum and its crosstalk spectrum.

Referring to the FIG. 1 the inventors have found out that the crosstalk spectrum 11 and isotope spectrum 10 differ substantially from each other. The crosstalk spectrum 11 is always in the lower energy region, because crosstalk light contains always a reduced number of photons than sample light, because a certain amount of photons is absorbed in the travel and only some of the crosstalk photons are detected by the detector.

The inventors have derived the mathematical model of the method in the following way:

As well as the magnitude of crosstalk is depending on the energy of the isotope, it is depending on the quench level of affecting sample: the higher the quench is the lower amount of scintillation photons are available. In addition crosstalk depends also on the distance between the detector and affecting sample in a similar way: the larger said distance is the lower amount of scintillation photons are coming to the detector.

According to this method samples are measured using three counting windows. Windows are recommended to select so that window 1 covers the lower half of the crosstalk spectrum and window 2 the higher part of the crosstalk spectrum and window 3 covers that part of isotope spectrum which does not overlap with the crosstalk spectrum. In the case shown in FIG. 1 window 1 should be 1–100, window 2 should be 101–200 and window 3 should be 201–650.

When measuring a sample in a certain well of the sample plate, the mathematical model for observed count rates I1, I2 and I3 is:

$$I1 = Bg1 + Ct1*Ac + E1*A,$$
$$I2 = Bg2 + Ct2*Ac + E2*A,$$
$$I3 = Bg3 + Ct3*Ac + E3*A,$$
(Eq. 1)

where $Bg1$, $Bg2$ and $Bg3$ = normal background count rates (cpm) in the windows 1, 2 and 3, $Ct1$, $Ct2$ and $Ct3$ = degree of affection of other samples called here crosstalk counting efficiencies in the windows 1, 2 and 3, $E1$, $E2$ and $E3$ = counting efficiences in the windows 1, 2 and 3, $A$ = activity (cpm) of sample to be measured, $Ac$ = activity of other samples, which affect crosstalk, called here effective crosstalk activity (dpm).

Units: cpm = counts per minute,
dpm = disintegrations per minute.

Activity A of the sample (and also Ac) can be solved by applying weighted least square regression method, where in general the best fit of the function f(x) to the values yi is found by minimizing
$S = SUM\ ((f(xi) - yi) \wedge 2/(dyi) \wedge 2)$ by setting $dS/dxi = 0$.

In this case the sum is $$S = S(A,Ac) = \qquad\qquad\qquad\qquad\text{(Eq. 2)}$$
$$(Ct1*Ac + E1*A - (I1 - Bg1))\ 2/(60*I1/t) +$$
$$(Ct2*Ac + E2*A - (I2 - Bg2))\ 2/(60*I2/t) +$$
$$(Ct3*Ac + E3*A - (I3 - Bg3))\ 2/(60*I3/t),$$

which is minimized by setting
$dS/dAc = 0$ and $dS/dA = 0$.

This yields to $$A = (a2*c1 - a1*c2)/(b1*a2 - b2*a1)$$

$$Ac = (b1*c2 - b2*c1)/(b1*a2 - b2*a1),\qquad\text{Eq. 3}$$
where $a1 = Ct1*Ct1/(I1 - Bg1) + Ct2*Ct2/(I2 - Bq2) + Ct3*Ct3(I3 - Bg3),$ $a2 = E2*Ct1/(I1 - Bg1) + E2*Ct2/(I2 - Bg2) + E3*Ct3/(I3 - Bg3),$ $b1 = Ct1*E1/(I1 - Bg1) + Ct2*E2/(I2 - Bg2) + Ct3*E3/(I3 - Bq3),$ $b2 = E1*E1/(I1 - Bg1) + E2*E2/(I2 - Bg2) + E3*E3/(I3 - Bg3),$ $c1 = Ct1 + Ct2 + Ct3,$ $c2 = E1 + E2 + E3.$ In Eq. 2 t = measuring time in seconds.

This shows that activity A of the measured sample can be solved from observed count rates I1, I2 and I3, if background count rates Bg1, Bg2 and Bg3, counting efficiencies E1, E2 and E3 and crosstalk counting efficiencies Ct1, Ct2 and Ct3 are known as a function of quench level in priori.

The method in practice is the following:
I. Crosstalk standardization

Figure 2:
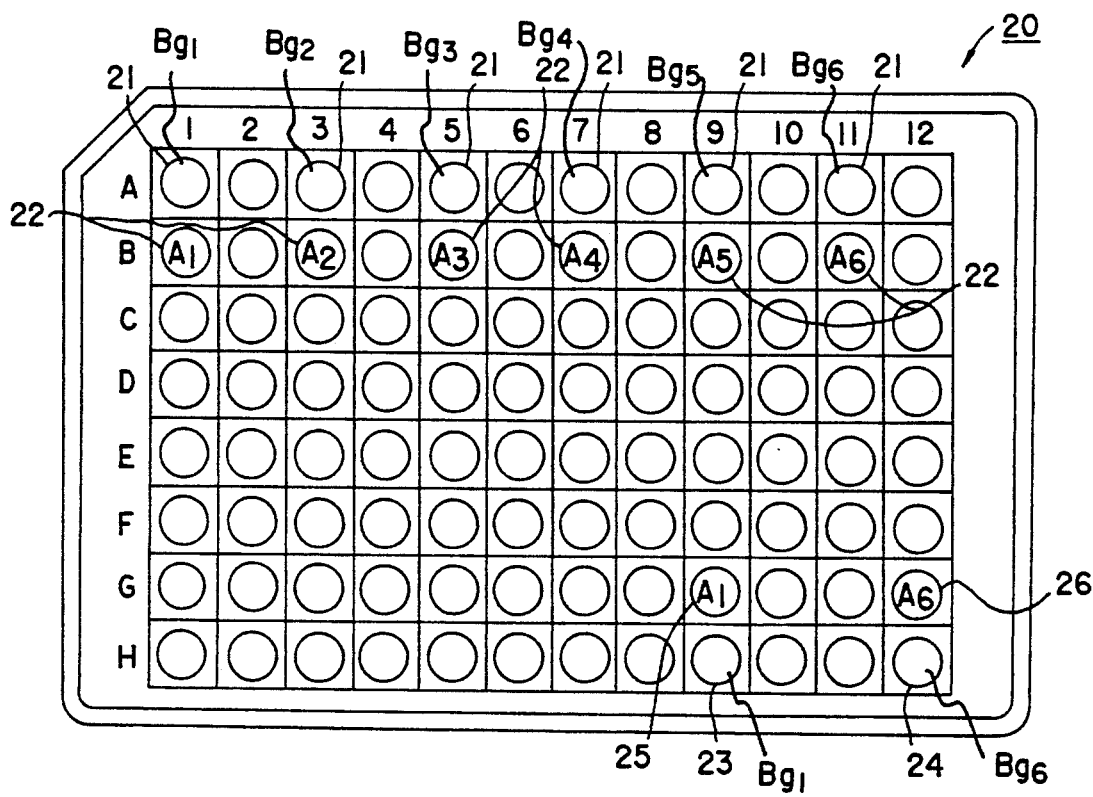
FIG. 2 shows the preferred positions for the standardization samples in a 96-well sample plate suited for 1450 MicroBeta.

The purpose of this crosstalk standardization is to define and to store for further use crosstalk efficiencies Ct1, Ct2 and Ct3 as a function of the quench level and counting efficiencies E1, E2 and E3 as a function of the quench level needed in Eq. 3. Here it is assumed that backgrounds Bg1, Bg2 and Bg3 are much smaller than the increase in count rates due to the crosstalk which means in practice that the activity of the isotope standards should be high enough. Referring to the FIG. 2 the following standardization samples are prepared to similar sample plate 20 used for the samples to be analyzed:

Non-isotope standards are prepared in the sample wells A01, A03, A05, A07, A09 and A11 marked by reference number 21 in FIG. 2. Isotope standards with same amount of activity but an increasing amount of quench are prepared in to the sample wells B01, B03, B05, B07, B09, B11 marked by reference number 22 in FIG. 2. The reason why isotope standards are deposited in every second well is that inventors have found out that in practice the distance between the isotope standards is then long enough to prevent crosstalk between standardization samples. In addition the least quenched isotope standard in the well B01 is replicated in to the well G09, reference number 25, and the most quenched isotope standard in the well B11 is replicated in well G12, reference number 26, and non-isotope standard is replicated in the wells H09, reference number 23, and H12, reference number 24.

The standardization procedure is as follows:

1) At first, isotope standards which are in the wells B01, B03, B05, B07, B09 and B11, are measured by detector 1 and isotope standards which are in the position G12 and G09 are measured by each detector.

2) The following standard curves of the detector 1 are then calculated and stored $E1(q) = I1(q)/A$, (q = quench level), $E2(q) = I2(g)/A$, $E3(q) = I3(q)/A$, $Etot(q) = Itot(q)/A.$  (Eq. 4)

For each detector the values, of E1 (G09), E2(G09), E3(G09), Etot(G09), E1(G12), E2(G12), E3(G12) and Etot(G12) are stored.

3) The standardization procedure continues automatically by measuring the non-isotope standards, which are in the wells A01, A03, A05, A07, A09 and A11 by detector 1 and by measuring non-isotope standards, which are in the wells H09 and H12, by each detector.

4) Taking into account that Ac = A (Isotope standards were so far from each other that only one of them can cause crosstalk to a certain non-isotope standard.) and quench levels of the non-isotope standards can be converted to correspond to quench levels of the isotope standards by setting quench levels of corresponding standards equal eg. quench level of A1 is equal to quench level of B1 etc., the following standard curves of detector 1 can be then calculated and stored $Ct1(q)\ I1(q)/Ac,$ $Ct2(q)\ I2(q)/Ac,$ $Ct3(q)\ I3(q)/Ac,$ $$Cttot(q) = Itot(q)/Ac. \quad (Eq. 5)$$

For each detector the values of Ct1(H09), Ct2(H09), Ct3(H09), Cttot(H09), Ct1(H12), Ct2(H12), Ct3(H12) and Cttot(H12) are stored.

II. Correcting measured count rates of the samples to be analyzed:

1) The count rates I1, I2 and I3 of an unknown sample are observed by the detector i.

2) Crosstalk efficiencies Ct1, Ct2, Ct3 and Cttot and efficiencies E1, E2, E3 and Etot corresponding to the quench level of the sample to be analyzed are evaluated from the stored standard curves of detector 1. These values are found by an iterative process so that the correct values give highest possible value to the sum Cttot*Ac+Etot*A, which is equal to the sum I1+I2+I3 or total observed count rate of the sample to be analyzed.

3) These values are converted to correspond to the values of detector i by using formula:
   a) Crosstalk efficiencies:
   $$Ctj,i = Ctj,i(H12) + kct(Ctj - Ctj(H12)), \ (j=1,2,3), \quad (Eq. 6)$$

where $$kct = (Ctj,i(H12) - Ctj,i(H09))/(Ctj(H12) - Ctj(H09)),$$

where

Ctj,i = crosstalk efficiency in window j (j=1,2,3) of detector i,

Ctj crosstalk efficiency in window j (j=1,2,3) read out from detector 1 standard curve, Ctj(H12) = crosstalk efficiency in window j (j=1,2,3) of position H12 standardization sample measured by detector 1.

Ctj(H09) = crosstalk efficiency in window j (j=1,2,3) of position H09 standardization sample measured by detector 1.

Ctj,i(H12) = crosstalk efficiency in window (j=1,,2,3) of position H12 standardization sample measured by detector i, Ctj,i(H09) = crosstalk efficiency in window j (j=1,2,3) of position H09 standardization sample measured by detector i, b) Efficiencies:
$$Ej,i = Ej,i(G12) + ke(Ej - Ej(G12)), \ (j=1,2,3), \quad (Eq. 7)$$

where $$ke\ (Ej,i(G12) - Ej,i(G09))/(Ej(G12) - Ej(G09)),$$

where

Ej,i = efficiency in window j (j=1,2,3) of detector i,

Ej = efficiency in window j (j=1,2,3) read out from detector 1 standard curve,

Ej(G12) = efficiency in window j (j=1,2,3) of position G12 standardization sample measured by detector 1.

Ej(G09) efficiency in window j (j=1,2,3) of position G09 standardization sample measured by detector 1.

Ej,i(G12) = efficiency in window j (j=1,2,3) of position G12 standardization sample measured by detector i, Gj,i(G09) = efficiency in window j (j=1,2,3) of position G09 standardization sample measured by detector 4) Activity A of the sample to be analyzed is then calculated from Eq. 3 by substituting observed I1-, I2- and I3-values and calculated efficiencies and crosstalk efficiencies.

Figure 3:
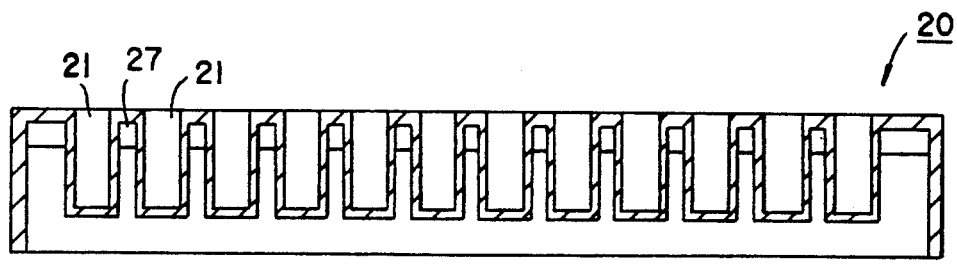
FIG. 3 shows the cross section of the sample plate of FIG. 2 where the wells are joined together with ribs.

Referring to FIG. 3 it shows the cross section of the sample plate 20 of FIG. 2. The wells 21 are joined together with ribs 27. In this kind of structure it is impossible to isolate the wells optically. So some amount of the scintillation photons will travel from a sample well to another sample well close to it producing an increase in observed count rates in those wells. This crosstalk problem is eliminated by the invention of this application. The method according to the present invention is not confined to the above description alone, but it may show even considerable variation within the scope of the patent claims.

We claim:

1. Method for correcting measuring values in a liquid scintillation counter when measuring samples deposited on sample plates, where a detector in addition to scintillation photons from a sample to be analyzed is affected by the scintillation photons from other samples on the sample plate, characterized by pre-determining a quench dependence of degree of affection by measuring at least two isotope samples with identical activities but different quench levels and at least two non-isotope samples deposited on adjacent wells of said isotope samples, whereafter the measuring value for said sample is corrected by said pre-determined degree of affection from the other samples, which degree of affection depends on the quench level on each sample.

2. Method according to claim 1, characterized by measuring said samples for pre-determining said degree of affection as a function of the quench level only in one detector and by measuring degree of affection of the lowest and the highest quenched samples in other detectors and by converting said degree of affection in one detector to correspond to the other detectors using measured degree of affection of said lowest and highest quenched samples.

3. Method according to claim 2, characterized by measuring said degree of affection, which depends on the quench level of the sample, by using at least three counting windows.

4. Apparatus for correcting measuring values in a liquid scintillation counter when measuring samples deposited on sample plates, where a detector in addition to the scintillation photons from sample to be analyzed is affected by the scintillation photons from other samples on the sample plate, characterized by that the apparatus pre-determines quench dependence of degree of affection by measuring at least two isotope samples with identical activities but different quench levels and at least two non-isotope samples deposited on adjacent wells of said isotope samples, whereafter the apparatus corrects the measuring value for said sample by said pre-determined degree of affection from the other samples, which degree of affection depends on the quench level on each sample.

* * * * *

UNITED STATES PATENT AND TRADEMARK OFFICE
CERTIFICATE OF CORRECTION

PATENT NO. : 5,225,980
DATED : July 6, 1993
INVENTOR(S) : Jiang Hsieh et al.

It is certified that error appears in the above-identified patent and that said Letters Patent is hereby corrected as shown below:

Col. 12, line 20   "2 slope" should be -- $\frac{2}{\text{slope}}$ --

Signed and Sealed this

Twenty-second Day of February, 1994

Attest:

BRUCE LEHMAN

Attesting Officer    Commissioner of Patents and Trademarks